United States Patent

Taub et al.

[11] Patent Number: 4,562,333
[45] Date of Patent: Dec. 31, 1985

[54] STRESS ASSISTED CUTTING OF HIGH TEMPERATURE EMBRITTLED MATERIALS

[75] Inventors: Alan I. Taub, Schenectady; Peter G. Frischmann, Scotia; Harvey E. Cline, Schenectady, all of N.Y.

[73] Assignee: General Electric Company, Schenectady, N.Y.

[21] Appl. No.: 647,207

[22] Filed: Sep. 4, 1984

[51] Int. Cl.$^4$ ................................. B23K 26/00
[52] U.S. Cl. .................. 219/121 LJ; 219/121 LM
[58] Field of Search .............. 219/121 LH, 121 LJ, 219/121 LQ, 121 LM, 121 L

[56] References Cited

U.S. PATENT DOCUMENTS

| | | | |
|---|---|---|---|
| 3,453,097 | 7/1969 | Hafner | 214/121 L UX |
| 3,610,871 | 10/1971 | Lumley | 219/121 LH |
| 3,695,497 | 10/1972 | Dear | 219/171 LQ X |
| 4,328,411 | 5/1982 | Haller et al. | 219/121 LG X |
| 4,401,876 | 8/1983 | Cooper | 219/121 LH X |

Primary Examiner—C. L. Albritton
Attorney, Agent, or Firm—Paul E. Rochford; James C. Davis, Jr.; James Magee, Jr.

[57] ABSTRACT

A method of severing an article subject to hot short phenomena is taught. A seam of the article is heated to bring it to the hot short condition and to have the remainder of the article at a temperature outside of the hot short range. A force is then applied to the seam to cause the article to sever due to brittleness of the material of the seam.

5 Claims, 6 Drawing Figures

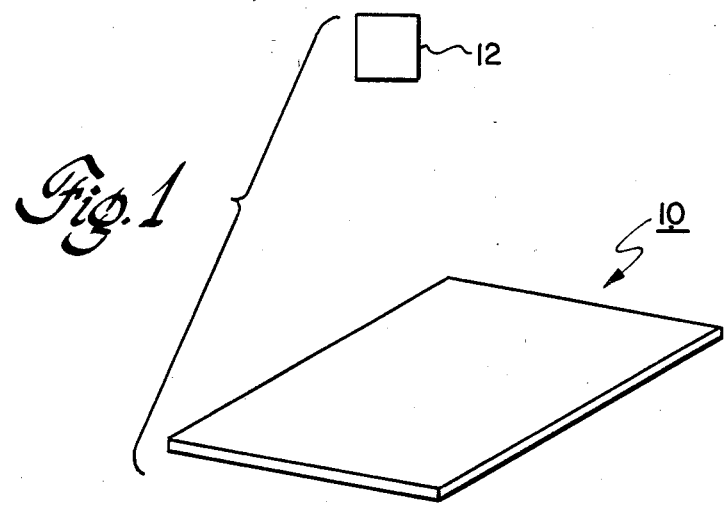
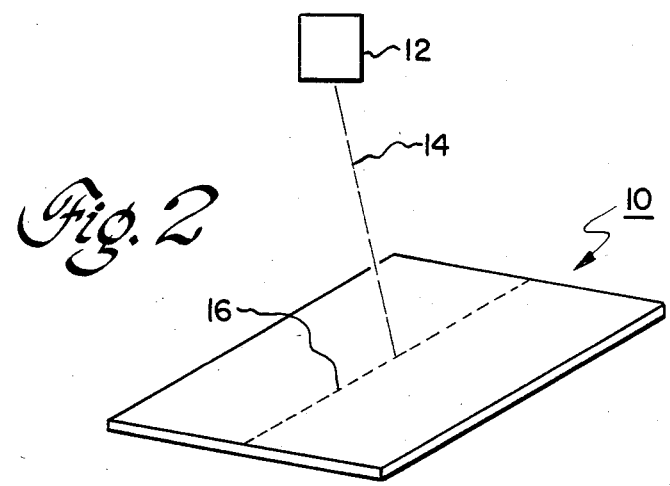
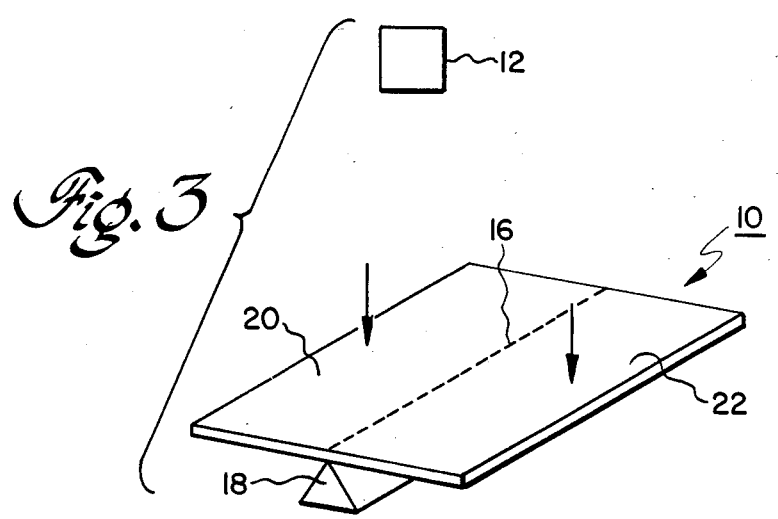

sense that it permits a breaking force to be applied to the seam 16 by pressing down on each side 20 and 22 of the sheet in the direction of the arrows as shown in the figure However, it will be understood that such breaking force could be any convenient and conventional force such as a torsional force or tension or vibratory force applied to the material of the sheet so as to fracture the material in the seam 16 while this material is in the hot short brittle condition characteristic of the hot short temperature range.

Referring next to FIG. 4, result of carrying out the process of the present invention is schematically illustrated by showing the two sections 20 and 22 which were formed by breaking the sheet 10 and the fulcrum 18 which was used in applying force along the heated seam to cause the condition characteristic of the hot short condition.

It will be understood that the edge 24 which is formed by the fracture is not found as the result of a necking down of the material but rather it is the result of intergranular failure and that there is very little, if any, deformation of the material of the sheet in the area adjacent to the newly formed edge such as 24.

A photomicrograph of an edge of a sheet material formed pursuant to the present invention is presented in FIG. 5. The intergranular nature of the severed sheet is evident from the photomicrograph.

A second photomicrograph is the subject matter of FIG. 6. The specimen sheet, a parted edge of which is illlustrated, is a sheet of boron modified trinickel aluminide which was resistance self-heated to the hot short temperature range before being parted. Note that the parting is clean cut with no melt back and that no neck formed.

What is claimed and sought to be protected by Letters Patent in the United States is as follows:

1. A method for severing a normally ductile article which exhibits a hot-short phenomena and which has at least one small dimension which comprises
    heating the article along a seam at which severance is to occur to a temperature which imparts hot short properties to the material of the seam,
    applying force to the seam while the material of said seam is in the hot short condition to cause a separation of the material into parts due to fracture of the hot short material of the seam while at the hot short temperature.

2. The method of claim 1 in which the article is a rod.

3. The method of claim 1 in which the article is a wire.

4. The method of claim 1 in which the article is a ribbon.

5. The method of claim 1 in which the article is a sheet.

* * * * *

STRESS ASSISTED CUTTING OF HIGH TEMPERATURE EMBRITTLED MATERIALS

BACKGROUND OF THE INVENTION

The present invention relates generally to improvements in methods of severance of sheet materials and to parts. More particularly, it relates to the cutting or parting of materials in ribbon strip or wire form for materials which are subject to embrittlement at high temperatures.

It is known that certain materials exhibit "hot shortness". This hot shortness is a tendency to embrittle at elevated temperatures. An example of a material which is subject to hot shortness is the nickel aluminide $Ni_3Al$. Materials which exhibit hot shortness have a high temperature ductility minimum. That is, they are ductile at temperatures above the temperatures at which the hot shortness occurs and they are also ductile at temperatures below that at which the hot shortness occurs. However, at a specific temperature in a specific temperature range, they do suffer a reduction in ductility so that for the ductility over the full range of temperatures to which the material may be heated, there is a ductility minimum at a given high temperature range. The nickel aluminides are subject to hot shortness in that there is a temperature in the range of about 1200° F. to 1400° F. where the ductility of the material goes through a reduction to a minimum value. These materials are brittle within the designated temperature inasmuch as the ductility is at a reduced level. However, these same materials are not brittle at higher temperatures or at lower temperatures.

A method for cutting thin metal sheet with an electron beam is disclosed in U.S. Pat. No. 4,356,377. According to this patent, an electron beam may be employed to fully cut through a ribbon by melting along some pattern on the ribbon and spinning the ribbon over a wheel to eject droplets of metal from the ribbon. Also, it may be employed to partially melt the ribbon to form a furrow which weakens the ribbon and by mechanical action is then broken to permit parts to be separated or seams to be opened in the ribbon.

The method of the present invention is quite distinct in that it relies on the hot short characteristic of the material, which may be a ribbon, to form an embrittled seam or pattern in the ribbon and to permit the ribbon to be broken along the embrittled seam.

BRIEF STATEMENT OF THE INVENTION

One object of the present invention is to provide a method which permits cutting of a strip of sheet material which is subject to the hot short phenomena.

Another object is to provide a method which permits material subject to hot short phenomena to be cut in a facile and precise manner.

Another object is to provide a method which takes advantage of the hot short characteristic of the material to develop a weakened zone in the material.

Other objects will be in part apparent and in part pointed out in the description which follows.

In one of its broader aspects, objects of the invention may be achieved by placing the sheet or strip of material subject to the hot short phenomena in the path of a beam of intense radiant energy and heating the sheet along a selected seam to a temperature at which the material has a minimum ductility. While the material is at the temperature at which it has such minimum ductility, the material is worked to cause a fracture of the material along the seam and thereby to cause a separational or parting of the material.

BRIEF DESCRIPTION OF THE DRAWINGS

The explanation which follows will be made clearer by reference to the accompanying drawings in which:

FIG. 1 is a schematic illustration of a heat source and a sheet of material subject to the hot short phenomena.

FIG. 2 is a similar schematic illustration of such a sheet being rapidly heated along a seam by heat from the source.

FIG. 3 is a similar schematic illustration of the sheet of material shown in relation to a fulcrum adapted to apply force to the embrittled region.

DETAILED DESCRIPTION OF THE INVENTION

Figure 4:
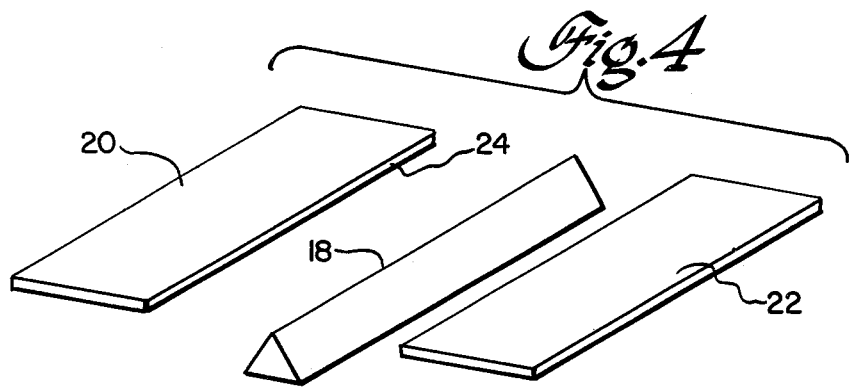
FIG. 4 is a similar schematic illustration of the sheet material which has been broken along the seam into two sheet portions.
Figure 5:
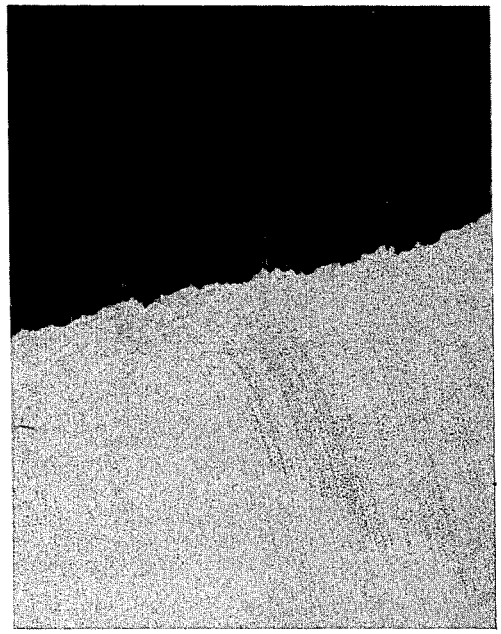
FIG. 5 is a photomicrograph of the edge of a laser assisted parted sheet of boron modified nickel aluminide illustrating the character of the surface formed as the material is split.
Figure 6:
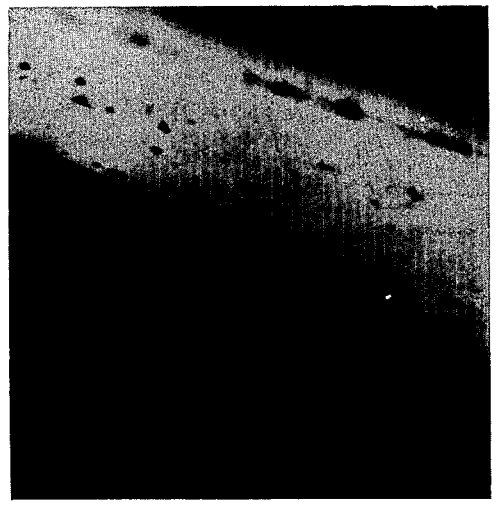
FIG. 6 is a photomicrograph of the edge of a sheet of boron modified nickel aluminide which was parted with the assistance of resistance self-heating of the sample.

Referring now first to FIG. 1, a schematic illustration of a sheet of material and an energy source to be used in connection with severing the sheet are shown. The sheet 10 is disposed proximate the source 12 of high energy radiation. The heat source 12 is used to raise the temperature along a narrow path or seam of the sheet to a temperature in the hot short range.

The sheet 10 may have an appreciable thickness just so long as the heating of the seam brings that portion of the sheet along the path of the seam along which the severance is to occur, within the hot short range while the remainder of the sheet is below this range. In this way, when a breaking force is applied to the sheet, the break will occur and does occur along the seamline of the sheet to preferentially cause a parting at the seam rather than at some other location of the sheet.

Referring next to FIG. 2, a beam 14 is emitted from the source 12 of radiant high energy. The beam is caused to traverse sheet 10 along the proposed seam 16 represented by the dashed line of the schmatic representation of FIG. 2. For example, for a sheet of $Ni_3Al$, the beam 14 may be the laser beam and the traversing of the sheet by the laser beam should bring the temperature of the seam to a temperature of about 600° C. or 1100° F. Preferably, the heating is done very rapidly so that the material of the sheet in the zone of the proposed seam is heated to the desired temperature and the material adjacent to this seam is at a significantly lower temperature and specifically a temperature below or outside of the hot short range. In this respect, it is important to understand that the severance of the sheet of material must be accomplished while the seam is in the hot short temperature range and has the characteristic weakness and brittleness which is found for the material while in this range.

Referring next to FIG. 3, the sheet 10 is again schematically illustrated as positioned over a fulcrum 18. The fulcrum is oriented so that it is aligned with the seam 16 of the sheet. The fulcrum 18 is schematic in the